US011265215B2

(12) United States Patent
Abes et al.

(10) Patent No.: US 11,265,215 B2
(45) Date of Patent: Mar. 1, 2022

(54) SYSTEM AND METHOD OF STRATEGY DRIVEN OPTIMIZATION OF COMPUTER RESOURCE CONFIGURATIONS IN A CLOUD ENVIRONMENT (71) Applicant: CloudHealth Technologies, Inc., Boston, MA (US)

(72) Inventors: Andi Abes, Waltham, MA (US); Joe Kinsella, Reading, MA (US)

(73) Assignee: VMWARE, INC., Palo Alto, CA (US)

( * ) Notice: Subject to any disclaimer, the term of this patent is extended or adjusted under 35 U.S.C. 154(b) by 367 days.

(21) Appl. No.: 16/109,653

(22) Filed: Aug. 22, 2018

(65) Prior Publication Data
US 2020/0067773 A1 Feb. 27, 2020

(51) Int. Cl.
*H04L 12/24* (2006.01)
*H04L 29/08* (2006.01)
(Continued)

(52) U.S. Cl.
CPC ...... *H04L 41/0823* (2013.01); *H04L 41/0806* (2013.01); *H04L 41/14* (2013.01); *H04L 67/10* (2013.01)

(58) Field of Classification Search
CPC . H04L 41/0823; H04L 41/0806; H04L 41/14; H04L 67/10
See application file for complete search history.

(56) References Cited

U.S. PATENT DOCUMENTS

2005/0015641 A1* 1/2005 Alur .................... G06F 11/1458
714/2
2007/0250829 A1* 10/2007 Hillier ................. H04L 41/0873
717/170
(Continued)

OTHER PUBLICATIONS

"Amazon EC2 Auto Scaling", 9 pages, https://aws.amazon.com/ec2/autoscaling/?sc_channell=ba&sc_campaign...c_medium=button&sc_country=global&sc_geo=global&sc_outcome=aware, retrieved Aug. 24, 2018.

(Continued)

*Primary Examiner* — Christopher B Robinson
(74) *Attorney, Agent, or Firm* — Hanley, Flight & Zimmerman, LLC (57) ABSTRACT

A computer-implemented method of optimizing a computer resource configuration in a cloud environment to provision an information technology service includes determining performance objectives for a provisioned information technology service. Constraints for the provisioned information technology service based on the determined performance objectives are determined. A desired computer resource configuration to achieve the determined performance objectives for the provisioned information technology service and to meet the determined constraints for the provisioned information technology service is determined. Then a computer resource configuration is compared with the desired resource configuration to determine configuration actions wherein the configuration actions comprise transitioning a computer resource in the computer resource configuration to a new computer resource configuration. Available computer resources in the cloud environment are configured as well as the computer resource configuration in the cloud environment to realize the determined configuration actions. A current performance of the configured available computer resources in the cloud environment is evaluated as well as a current performance of the configured computer resource configuration in the cloud environment compared to the performance objective. Then, the method determines if the desired computer resource configuration has been achieved based on the evaluated current performance of the configured available computer resources in the cloud environment and the evaluated current performance of the configured computer resource configuration in the cloud environment. Then a history is generated of performance using the evaluated current performance of the configured available com- (Continued)

puter resources in the cloud environment and the evaluated current performance of the configured computer resource configuration in the cloud environment. A new desired computer resource configuration to achieve the determined performance objectives is then determined using the generated history of performance.

55 Claims, 5 Drawing Sheets

(51) Int. Cl.
*H04L 41/0823* (2022.01)
*H04L 41/14* (2022.01)
*H04L 41/0806* (2022.01)
*H04L 67/10* (2022.01)

(56) References Cited

U.S. PATENT DOCUMENTS

| | | | | |
|---|---|---|---|---|
| 2009/0327353 | A1* | 12/2009 | Zhuge | G06F 11/3419 |
| 2010/0005173 | A1* | 1/2010 | Baskaran | G06F 9/5066 |
| | | | | 709/226 |
| 2012/0079493 | A1* | 3/2012 | Friedlander | G06F 9/5027 |
| | | | | 718/104 |
| 2013/0346614 | A1* | 12/2013 | Baughman | G06F 9/5083 |
| | | | | 709/226 |
| 2014/0282037 | A1* | 9/2014 | Narasimhan | H04L 43/04 |
| | | | | 715/738 |
| 2015/0244595 | A1* | 8/2015 | Oberlin | H04L 41/5025 |
| | | | | 709/224 |
| 2017/0132542 | A1* | 5/2017 | Bostick | G06Q 10/06312 |
| 2017/0142189 | A1* | 5/2017 | Cabrera | H04L 67/18 |
| 2017/0373940 | A1* | 12/2017 | Shahab | H04L 47/70 |
| 2018/0173567 | A1* | 6/2018 | Olshefski | G06F 9/50 |

OTHER PUBLICATIONS

Jeff Barr, "AWS Auto Scaling", Jan. 6, 2018, 8 pages, Amazon Web Services, Inc., https://aws.amazon.com/autoscaling/, retrieved Aug. 24, 2018.

Jiangjie (Becket) Qin, et al., "Introduction to Kafka Cruise Control", 2016, 47 pages, LinkedIn Corporation, https://www.slideshare.net/JiangjieQin/introduction-to-kafka-cruise-control-68180931, retrieved Aug. 24, 2018.

"What are Virtual Machine Scale Sets?" Mar. 26, 2018, 3 pages; https://docs.microsoft.com/en-us/azure/virtual-machine-scale-sets/overview, retrieved Aug. 24, 2018.

Meng Zhang, "Nuage: Making Data Systems Management Scalable", Aug. 7, 2018, 7 pages, LinkedIn Corporation, https://engineering.linkedin.com/blog/2018/08/nuage—making-data-systems-management-scalable, retrieved Aug. 24, 2018.

Manish Dubey, "Rain: Better Resource Allocation Through Containerization", May 10, 2016, 6 pages, LinkedIn Corporation, https://engineering.linkedin.com/blog/2016/05/rain—better-resource-allocation-through-containerization, retrieved Aug. 24, 2018.

U.S. Appl. No. 16/024,146, filed Jun. 29, 2018 in the USPTO.
U.S. Appl. No. 15/952,181, filed Apr. 12, 2018 in the USPTO.
U.S. Appl. No. 15/722,356, filed Oct. 2, 2017 in the USPTO.

* cited by examiner

SYSTEM AND METHOD OF STRATEGY DRIVEN OPTIMIZATION OF COMPUTER RESOURCE CONFIGURATIONS IN A CLOUD ENVIRONMENT

The section headings used herein are for organizational purposes only and should not to be construed as limiting the subject matter described in the present application in any way.

INTRODUCTION

Many businesses are increasingly moving their information technology to cloud-based systems and/or cloud computer infrastructures. In this environment, information technology (IT) organizations are charged with delivering business service to provide specific functions while at the same time maintaining required strategic performance objectives around security, data locality, availability, cost and many other factors. These factors represent both internal objectives and constraints or requirements imposed by best practices and government regulations. Achieving and maintaining strategic-business-driven performance objectives in a dynamic information technology environment requires new computer-based systems and methods.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments of steps of the method as long as the teaching remains operable.

Many aspects of the present teaching relate to cloud-based computer infrastructures. The terms "cloud" and "cloud-based infrastructure" as used herein include a variety of computing resources, including computers, storage, software services and networking resources that run over a variety of physical computing and communications infrastructures, including wired and/or wireless communication infrastructures. The physical computing and communication infrastructures may be privately or publicly owned, used and operated. In particular, it should be understood that the term "cloud" as used herein can refer to all of private clouds, public clouds, and hybrid clouds when appropriate. The term "private cloud" refers to computer hardware, networking and computer services that run entirely or almost entirely over a private or proprietary infrastructure. The term "public cloud" refers to computer hardware, networking and services that are operated by a service provider for the use and benefit of many independent organizations and third party users, and is typically accessible over public networks. The term "hybrid cloud" refers to computer hardware, networking, and services that utilize infrastructure in both the private cloud and in the public cloud.

The system and method of the present teaching provides the ability to deliver business services using cloud-based information technologies that have a specific function and maintain necessary strategic performance objectives. The cloud-based information technology includes computer resources such as servers, CPU, storage, virtual machines (VM), software services, web services, network transit services, search and many other known computer resources. Strategic performance objectives are based around security, data locality, availability, cost and many other factors. The system and method of the present teaching optimizes configurations of the computer resources in the cloud using a business-strategy-driven approach. The optimized configurations may include existing computer resources as well as newly provisioned computer resources and the de-provisioning of computer resources, as driven by the performance objectives. The business strategy is determined, for example, by internal business objectives and/or constraints imposed by best practices and regulations by government or other bodies. The constraints can include various requirements imposed internally and externally. The business strategy is automatically converted into computer resource configurations that are dynamic and meet the objectives and constraints or requirements. The system and method of the present teaching achieves and maintains strategic performance objectives in a dynamic environment by mapping the strategic performance objectives into different environments, technologies and business contexts. The system and method helps to ensure compliance of the IT environment with the performance objectives and constraints.

Prior approaches to provisioning computer services on the cloud offer only point solutions. For example, in prior art systems optimization of resources occur over only one objective or outcome and/or over one part or aspect of a business or other organization. In contrast, the method and system of the present teaching consolidates desired business outcomes across different factors (security, cost, availability, etc.), within the context of a business concern (function, organization, etc.). This drastically reduces the burden in creating and maintaining policies. Prior art systems also do not operate repeatedly. Instead they apply policies only during initial provisioning of the IT systems. There is no continual improvement of the system over time, and/or in real time or near real time in prior art systems.

Figure 1:
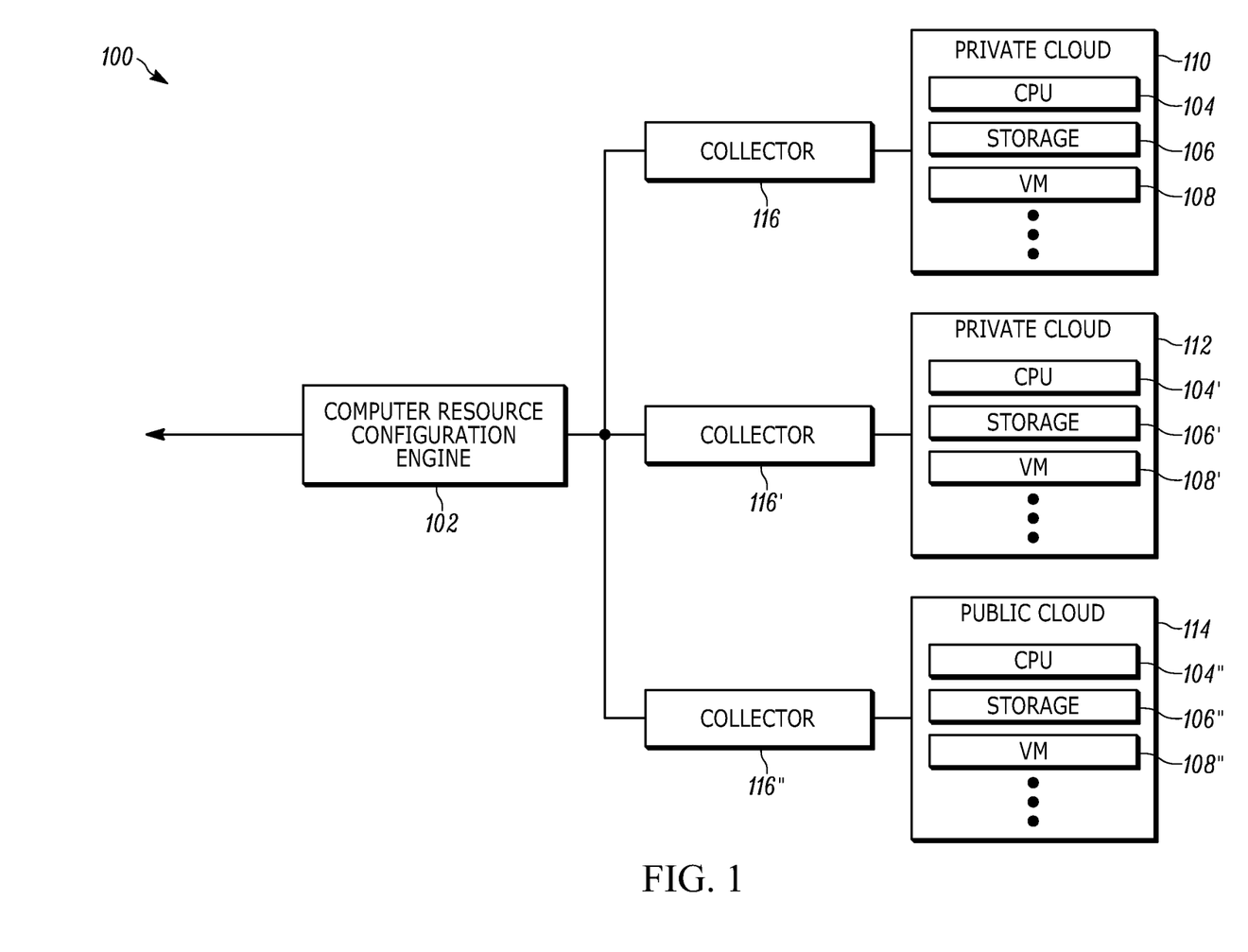
FIG. 1 illustrates a block diagram of an embodiment of the method and system for strategy-driven optimization of computer resource configurations in a cloud environment according to the present teaching.

FIG. 1 illustrates a block diagram of an embodiment of a method and system 100 for strategy-driven optimization of computer resource configurations in a cloud environment according to the present teaching. The system 100 includes a computer resource configuration engine 102 that is capable of optimizing one or more computer resources into a particular computer resource configuration that can be used to provision an information technology service and that meets a particular performance objective. The information technology service is provided by one or more provisioned cloud infrastructure elements such as, for example, CPU 104, 104', 104", storage 106, 106', 106" or virtual machine 108, 108', 108" that reside in any of a private cloud 110, 112, or public cloud 114. The computer resources also include various services that run on the infrastructure elements 104, 104', 104", 106, 106', 106", 108, 108', 108", including database services, virtual desktop, web services, search and many other services. One skilled in the art will appreciate that systems according to the present teaching can be used to optimize a computer resource configuration to provision an information technology service for other computer resources that are not shown explicitly in FIG. 1 or described explicitly in connection with FIG. 1.

The computer resource configuration engine 102 defines performance objectives for a provisioned information technology service. These performance objectives may be defined based on very high-level business objectives of a complex and hierarchical organization. The computer resource configuration engine 102 also determines constraints for the provisioned information technology service based on the defined performance objectives as well as any constraints or requirements related to the underlying computer technology. The computer resource configuration engine 102 determines a desired computer resource configuration that achieves the performance objectives and that will meet the constraints or requirements. Requirements are derived from the performance objectives (e.g., the amount of computing capacity) and limited by constraints (e.g. must be in a particular geography, and/or have a monetary cost below a limit etc.).

Collectors 116, 116', 116" leverage interfaces to the public and private cloud providers to collect the current state of the computer resources, such as infrastructure elements 104, 104', 104", 106, 106', 106", 108, 108', 108" and services running on these infrastructure elements 104, 104', 104", 106, 106', 106", 108, 108', 108". The collectors 116, 116', 116" provide the collected state information and provide it to the computer resource configuration engine 102 so that a computer resource configuration of the current provisioned IT service and available computer resources that can be added to the computer resource configuration of the current provisioned IT service can be determined. The computer resource configuration engine 102 compares the computer resource configuration of the current provisioned IT service with the desired resource configuration to determine configuration actions that can bring the configuration closer to the desired state. The configuration actions are imposed on the these applicable infrastructure elements 104, 104', 104", 106, 106', 106", 108, 108', 108" and services that run over the infrastructure elements 104, 104', 104", 106, 106', 106", 108, 108', 108". These configuration actions when implemented cause the current state to more closely match, or to match, the desired computer resource configuration.

In some embodiments, a monitor threshold is established in the computer resource configuration engine 102. Monitor thresholds ensure the computer resources continue to deliver on the performance objectives. Monitor thresholds are provided to the applicable infrastructure elements 104, 104', 104", 106, 106', 106", 108, 108', 108" and services that run over the infrastructure elements 104, 104', 104", 106, 106', 106", 108, 108', 108" via the collectors 116, 116', 116". Monitor thresholds notify the computer resource configuration engine 102 and/or users of the drift from the performance objective. This drift can trigger, e.g., notifications to users, changes in performance objectives, new desired resource configuration calculations and other events.

One key feature of the method and system present teaching is that it converts a high-level business strategy into performance objectives, such that an optimal, or near optimal, computer resource configuration can be determined to meet the objectives. As an example, one common performance objective is to ensure that data has sufficient protection, in the form of replication and backups across a diversity of geographies and mediums. The method and system of the present teaching can provide an optimal, or near optimal computer resource configuration that meets the objective in near-real time. The method and system of the present teaching can perform this optimization continuously, or at desired intervals. A user, e.g. a business or other organization, can simply describe desired business outcomes, and the system and method will manifest actions to achieve those outcomes using the underlying cloud-based infrastructure. Thus, the method and system of the present teaching substantially simplifies the process of configuring cloud infrastructures to meet business objectives.

Current state of the art systems require IT operators to control, configure and monitor for achievement of the objective at a very detailed level. Each computer resource technology (e.g. database, volumes, object-store system) requires its own set of controls and activities. Thus, in these prior art systems, this process is labor intensive and error prone. Additionally, these prior art systems use a process that is complicated by having to tailor and adjust the details based on context, depending on the purpose of environment (i.e. production vs. development), the rules applicable in the geography (e.g. data sovereignty rules in the European Union) and the purpose of the system (e.g. private user data versus public videos).

In contrast, the system and method of the present teaching provides an extensible mechanism whereby a performance objective can be expressed, such as "for production environment, ensure data protection with three-hundred mile geo-distributed, across two different administration domains with a 90 day data retention period", and the computer resource configuration engine 102 applies the relevant configuration to the underlying IT systems, such as infrastructure elements 104, 104', 104", 106, 106', 106", 108, 108', 108" and associated services. The computer resource configuration engine 102 may also monitor for the correct application of the resource configuration, and may also continuously adjust the IT systems as conditions evolve.

In a similar way, the system and method of the present teaching allows for objectives of cost and availability of resources to be expressed. For example, an expression such as "ensure that adequately performing Virtual Desktops are available to all branch workers during their business hours while minimizing cost" can be converted into performance objectives that are used to configure the computer resources. The system and method will take into account the locale of users in remote location and their business hours, their historic workload capacity needs and cost of these resources and use the combine set of data to provision and de-provision the best suited resources only for the duration they are needed to achieve the goal. The system and method will record how well the provisioned resources performed and utilized, and will adjust the desired set of resources for the next window of business hours accordingly.

Figure 2:
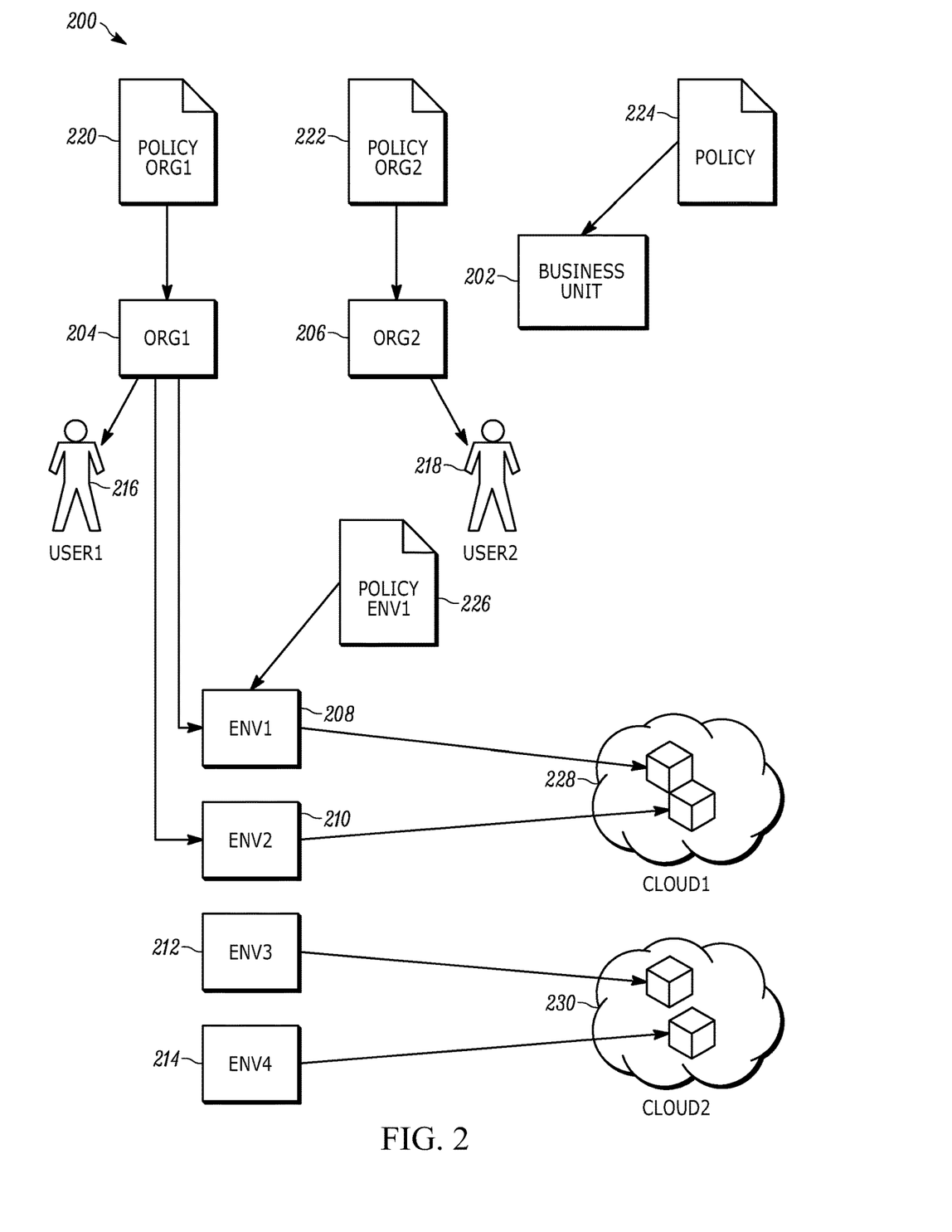
FIG. 2 illustrates an embodiment of the logical constructs involved in the operation of the method and system for strategy-driven optimization of computer resource configurations in a cloud environment according to the present teaching.

FIG. 2 illustrates an embodiment of the logical constructs 200 involved in the operation of the system for strategy-driven optimization of computer resource configurations in a cloud environment of the present teaching. Business unit 202, organization 204, 206 and environment 208, 210, 212, 214 are examples of hierarchically related groups that can be defined in the system. Users 216, 218 are associated with organizations 204, 206. The names given, e.g. business unit, organization, and environment, are meant to illustrate a possible mapping of hierarchical groups in the system to actual business structures. This is merely representative of a general mapping between defined groups and policy relationships that is used by the system and method of the present teaching to generate performance objectives. Policy documents, policy 220 for organization one 204, policy 222 for organization two 206, policy 224 for the business unit 202, and policy 226 for environment one 208, describe performance objectives to be achieved. A performance objective describes a set of goals and the context to which those goals are applicable. Policies 220, 222, 224, 226 are combined by accumulation down the hierarchy, e.g. from business unit 202 to organization 204, 206. In some embodiments, this is similar to folder permissions. As an example business unit 202 policy 224 can define "in all production environments, data shall have three replicas, geographically distributed with in the same geography." This performance objective would apply, then, to all environments 208, 210, 212, 214 in the purview of the business unit 202. This would be the case even if some of the environments 208, 210 are connected to one cloud 228, and other environments 212, 214 are connected to a second cloud 230. However, the system will track any implications of underlying technology differences in the different clouds 228, 230, as it relates to formulating the performance objectives based on the business strategy set forth in the policy 224 of the business unit 202.

One feature of the method and system of the present teaching is that it can be adapted and extended, for example, at runtime to support new underlying IT technologies, new cost metrics, and new types of performance objectives. This is often referred to as extensibility of the system. As an example, when a new type of storage technology is introduced into the computer resources in the cloud environment it is desirable to be able to optimize the data protection and retention objectives for this new technology. Storage is just an example of a technology type. Processors, services and other resource technology types may change or be introduced into the computer resources in the cloud environment.

The method and system of the present teaching also provides for the ability to inject new methods of adapting the desired configuration state, monitor for continuous compliance and take actions to adjust the state of the new technology to match the desired objectives. The method and system may also adapt to new performance objective types, and for adapt to new constraint types. This adapting to new capabilities is generic, and not restricted to a particular underlying technology type, such as storage technologies. As an example, a new mechanism to provision workloads might be introduced, which leverages KVM (Kernel Virtual Machine), a technology which allows run multiple workloads to execute in an isolated fashion on a single server machine. Another similar capability might introduce the ability to launch isolated workloads using Docker containers. These systems can be presented as extensions whereby they provide the ability to launch workloads, monitor their resource consumption and report cost metrics.

The method and system of the present teaching also provides for the ability to inject new cost measures to be introduced into the processing engine. These cost measures can be tracked towards a cumulative budget over time. The cost measures and budget can be monetary, but they can also include other kinds of costs, such as errors, time and other non-monetary costs. As an example, overall execution time of a set of batch computations can be tracked as budget, to support a performance objective optimized to deliver updated results in a given time period, repeatedly. To further this example, assume that a collated inventory report must be updated every day by 8 AM consistently. Every time the batch job completes after the target time, it is "penalized" by the amount of delay in minutes. Thus, a budget for delay after target time is formulated. The method and system of the present teaching would leverage this budget to optimize the computer resource configuration provisioned for the batch job within both monetary cost and performance cost metrics that are part of the performance objectives used to optimize the computer resource configuration.

As describe above, the extensibility of the method and system of the present teaching allows a broad application of the optimization of computer resource configurations to meet performance objectives that are driven by business strategy. Extensibility helps with scale and speed of delivery. Extensibility generally is provided by allowing new types of technologies, metrics, performance objectives and constraints to be added to the processes running in the computer resource configuration engine. These additions are stored in the memory that is part of the processing engine and/or repositories that are external to the engine. The additions may be added to the memory manually or automatically. The additions may be generated based on results from other execution steps of the method. For example, a user may change a technology type at run time. As another example, the method and system may discover a new computer resource technology type and automatically add it to the engine. As other examples, the method and system may change a performance objective based on a status of a budget or a monitor threshold. The method and system may change a performance objective based on an evaluation of the performance of the configured computer resources against the performance objectives.

Some specific examples of extensibility include: 1) applying existing performance objective component to new technology; 2) applying a data retention performance objective to new storage mechanism; 3) including server provisioning into a kernel-based virtual machine (KVM) based on agents; 4) use of a technology-specific monitoring threshold; 5) use of a new cost metric; 5) providing a budget for a number of common vulnerabilities and exposures (CVE's) in an environment 6) batch job execution time; 7) new type of performance objective; and 8) a particular server density.

Figure 3:
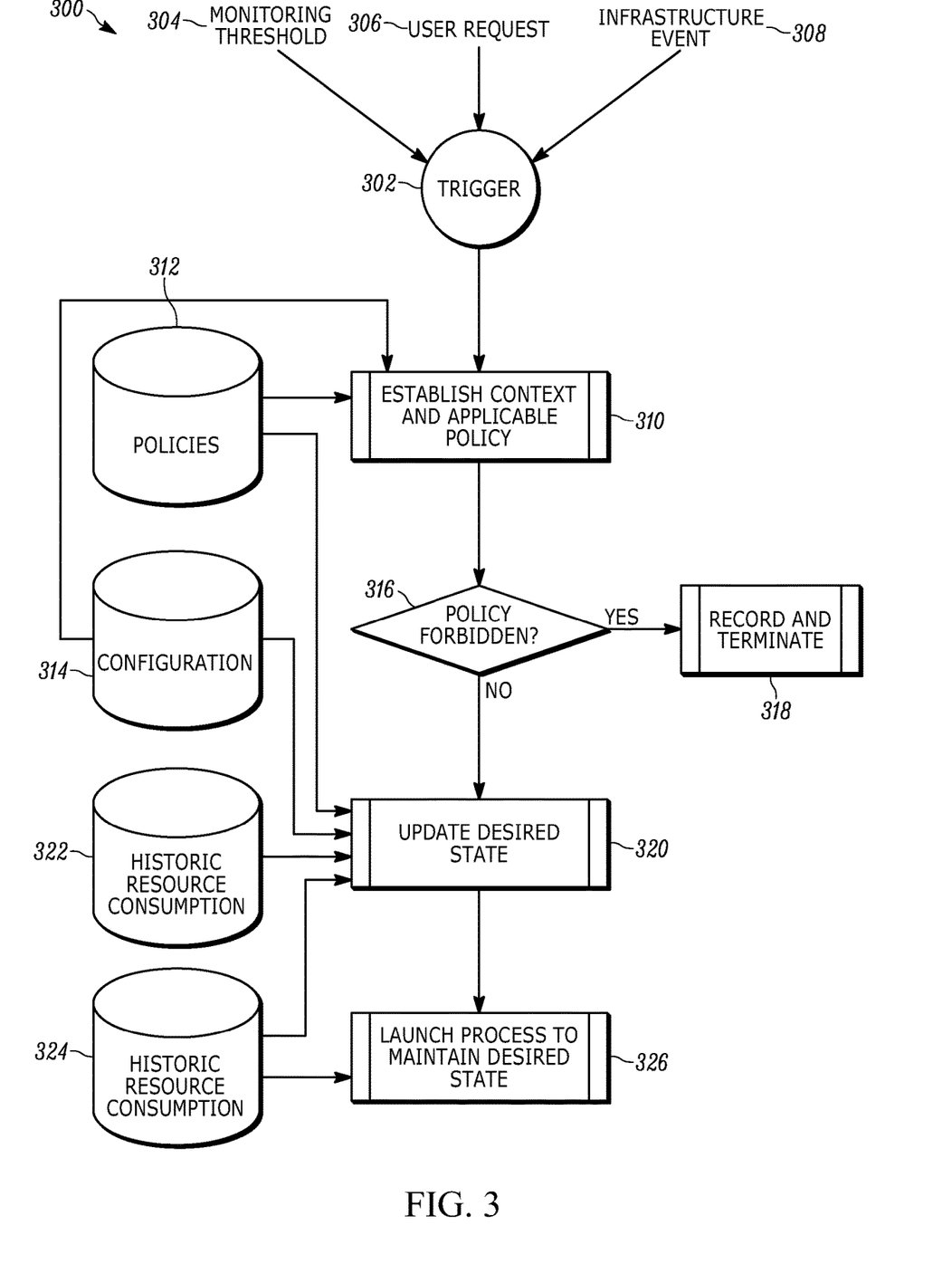
FIG. 3 illustrates a process flow diagram showing the policy computation of an embodiment of the method and system for strategy-driven optimization of computer resource configurations in a cloud environment according to the present teaching.

FIG. 3 illustrates a process flow diagram showing the policy computation of an embodiment of the system and method for strategy-driven optimization of computer resource configurations in a cloud environment according to the present teaching. A trigger 302 is initiated by at least one of a monitoring threshold 304, a user request 306 and/or an infrastructure event 308. The trigger 320 causes the processing engine to execute a step 310 of establishing context and applicable policy. The context and applicable policy are derived, at least in part, from the business strategy and hierarchy. A repository 312 that contains policies for the system provides policy information to the step 310 of establishing context and applicable policy. A repository 314 that contains configurations provides configuration information to the step 310 of establishing context and applicable policy. In a decision step 316, the processing engine determines if the policy established in the step 310 is forbidden. If decision step 316 results in yes, the system moves to a step 318 to record and terminate. If decision step 316 results in no, the system moves to a step 320 that updates the desired state based on the established context and applicable policy of the earlier step 310. This updating step 320 is provided policy information from the policy repository 312 and configuration information from the repository 314. The updating step 320 is provided historic resource consumption information from a first repository 322. The updating step 320 is also provided historic resource consumption information from a second repository 324. Once the desired state is updated in step 320, the processing engine moves to a step 326 to launch a process to maintain the desired state from step 320. This maintaining desired state step 326 is provided information on historic resource consumption from the second repository 324.

One feature of the present teaching is that it provides an automated system and method to convert high-level business strategy into performance objectives and an optimized computer resource configuration. Some embodiments of the present teaching use a business strategy engine to execute the step 310 of establishing context and applicable policy. The business strategy engine is described as a separate engine for clarity. However, it is understood that all the various processing engines described herein, including the business strategy engine, can be combined, in whole or in part, into various embodiments of processing engines that run the method and system of the present teaching.

The business strategy engine captures user business strategy as well as specific aspects of an organization that drive that strategy. A strategy may be composed of an optional set of conditions to determine where the strategy is applicable. The conditions can be specified using innate properties of the underlying infrastructure and/or using user supplied metadata. For example, properties can include geography (e.g. Europe). Properties can include user supplied labels that identify environments (e.g. production, quality assurance, etc.). Properties can include sensitivity of information and/or data (e.g. payment card industry (PCI) compliance, secret, public).

The business strategy engine also determines performance objectives. Performance objectives are specified by providing parameters (required and optional) to predefined objective types. A performance objective type provides the semantics and logic for the engine to apply continuous optimization to underlying systems.

The business strategy engine also determines budget values. A budget may include any measurable quantity, over time. Actions and events in the underlying environment trigger budget consumption events. The business strategy engine includes a runtime environment that orchestrates execution of actions on behalf of performance objective logic, and tracks history records. History comprises, for example, actions performed for auditing purposes, consumed and remaining budget values, and utilization and performance metrics as measured from the underlying IT environment.

A performance objective type provides lifecycle-hooks the engine invokes based on events (user triggered, engine triggered, scheduled or notifications from the underlying environment). Each lifecycle-hook (or software hook) can in turn report to the engine how its actions affected defined budgets. The engine also captures the impacts of the hooks activities on the environment in terms of utilization and performance. Both these measures are used to predict impact of future actions.

To apply strategy to an environment, the sequence of activities is as follows. A user defines a strategy using performance objectives. For example, in a reserved instance (RI) management objective, a user defines a strategy specifying budget for the quarter, and a desired percent of total hours to be covered by pre-purchased capacity (reserved instances, RI's). The strategy is attached to an environment identified by labels: environment='production'. As another example, in a server convergence objective, a user defines a strategy requiring server utilization of >=80% and attaches it to an environment identified by a public cloud account. As another example, in a data protection objective, a user defines a strategy to ensure data is replicated across two authorization domains and two locations within same geography.

In some embodiments, a business strategy hook for the policy objectives logic is invoked. This business strategy hook allows for the establishment of monitoring thresholds in the environment, and the gathering of initial system state. For example, RI management strategy ensures that current inventory of RI's is present, as well as current infrastructure matching those RI's. A scheduled event is configured to periodically (e.g. every 6 hours) re-evaluate the environment. As another example, the server convergence objective ensures that detailed utilization performance metrics are collected, and installs a monitoring threshold to notify the system when a persistent (e.g. >1 hour) underutilization condition is detected. Another example is a data protection objective. The current storage elements (databases, object-storage systems etc.) are inspected.

In some embodiments, systems that utilize storage systems have intrinsic support for replication. In these systems, the current configuration is evaluated. If the evaluation is satisfactory or exceeds the specified strategy, they are left intact. Otherwise, a desired configuration is generated (i.e. replicate AWS S3 object storage between us-east-1 and us-west-1 regions using 2 separate accounts) and configured. In some embodiments, systems that utilize storage systems do not have the intrinsic capabilities, and the system takes the desired action, and configured period scheduled actions, e.g. for databases, the system takes a snapshot, and when it is ready, copies it to a different geography.

In some embodiments, scheduled hooks are invoked. For example, a RI management strategy evaluates current conditions in the environment. If a deviation exists, it attempts first to apply actions with no budget impact (e.g. modify current existing RI's to match running infrastructure). Then, if budget remains, attempts to apply actions which consume budget (e.g. exchange current RI's with a true-up cost to better match desired coverage). The tracking budget is then updated. The actions are recorded for auditing. The current growth rate (based on stored history of capacity) is evaluated, compared to the remaining budget. If the growth rate projected until the end of the period as configured by the user for the budget will require budget higher than currently remaining, an alert is generated. If there is server convergence, no action is taken. For data protection, the system evaluates the schedule, and takes similar actions to the business strategy hook.

Some embodiments invoke a monitoring threshold hook. This hook allows performance objective logic to react to the environment when deviations from prescribed limits are detected. For example, if RI management, then no is action taken. If there is server convergence, the underutilized servers are identified form the monitoring threshold. Their recent utilization is inspected and based on configuration, either idle servers are turned off (if in public cloud) or idle virtual machines (VM) in data center are relocated to co-exist with other low-utilization VM's, such that the underlying server utilization is higher. Low utilization servers that are not idle are consolidated into larger servers, to be collocated and to increase overall utilization. If no existing server exists that can accommodate the combine low-utilization servers, a new one is launched. New monitoring thresholds are established for any new infrastructure. For data protection, there are no monitoring threshold actions.

Figure 4:
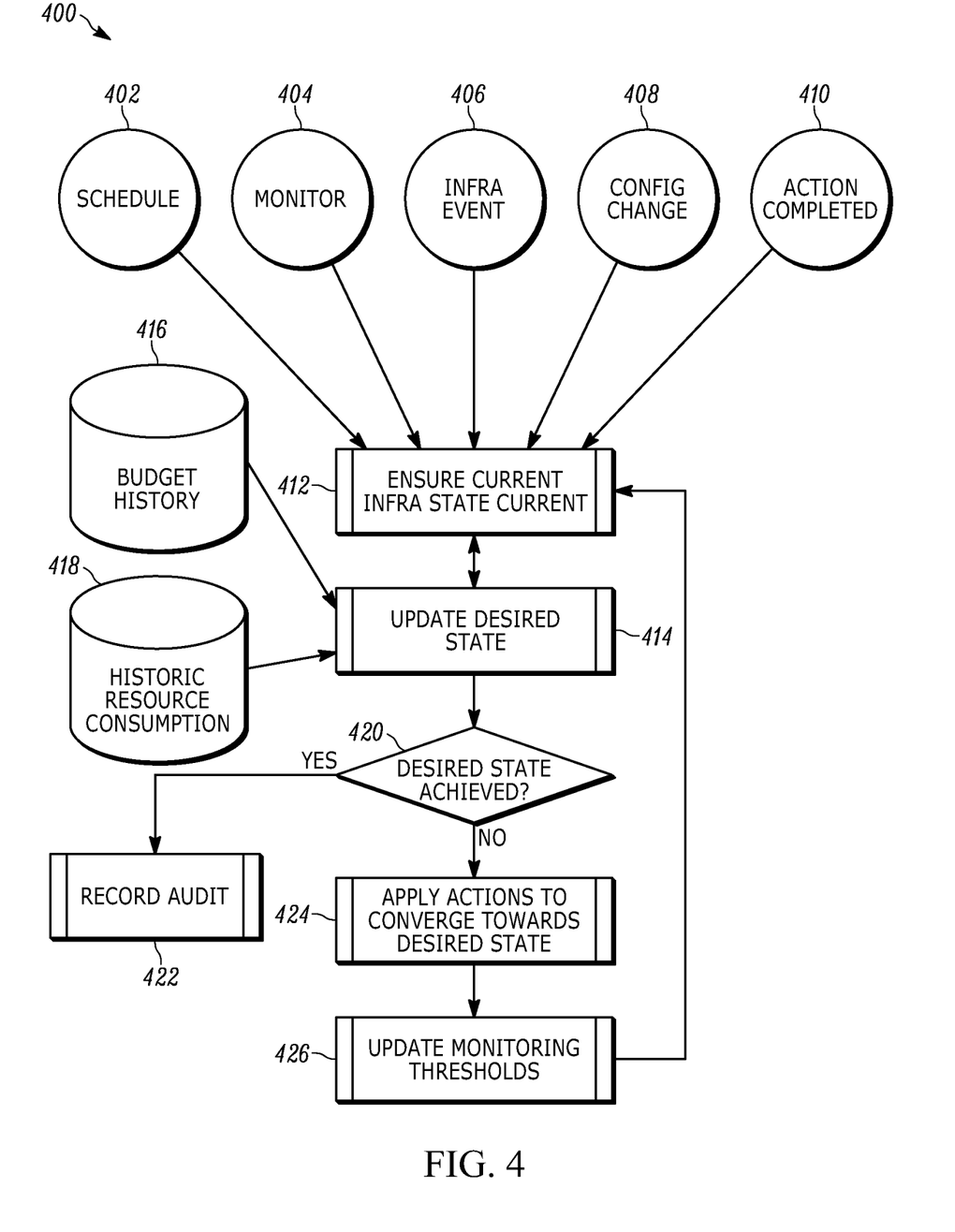
FIG. 4 illustrates a process flow diagram showing the updating of the infrastructure of an embodiment of the method and system for strategy-driven optimization of computer resource configurations in a cloud environment according to the present teaching.

FIG. 4 illustrates a process flow diagram 400 showing the updating of the infrastructure of an embodiment of a system and method for strategy-driven optimization of computer resource configurations in a cloud environment according to the present teaching. The updating of a resource configuration is triggered by any of a number of events. The trigger can be scheduled 402. The trigger can be based on a monitor threshold event 404. The trigger can also be caused by an infrastructure event 406. The trigger can also be a configuration change 408. In addition, the trigger can be based on completion of an action 410. The trigger 402, 404, 406, 408, 410 causes the processing engine in the system to move to a step 412 that ensures that the current state known to the processing engine is a correct and current state. Referring also to FIG. 1, step 412 can be realized by using collectors 116, 116', 116" to collect state information on a resource configuration or configurations of a particular one or more provisioned IT services on the various cloud infrastructures 110, 112, 114 (FIG. 1).

In a next step 414, the desired state is updated. The update of the desired state in step 414 is informed by data from a budget history repository 416 and/or a historic resource consumption history repository 418. Some embodiments of the system and method of the present teaching generate a budget that can be monetary or otherwise, and the budget value, which may change as the computer resource configurations are changed, are stored in the budget history repository 416. Some embodiments of the system and method of the present teaching generate history of performance information, which is stored in the historic resource consumption repository 418. In some embodiments, there is no change of the desired state resulting from the step 414.

In decision step 420, the processing engine determines if the desired state from step 414 is achieved. If decision step 420 results in yes, the system moves to a step 422 to record an audit that the desired state is realized. If decision step 420 results in no, the system moves to a step 424 that applies actions to converge towards the desired state of the earlier step 414. In step 426, the processing engine updates monitoring thresholds. The system may then move back to step 412 to repeat its convergence to a desired state.

Figure 5:
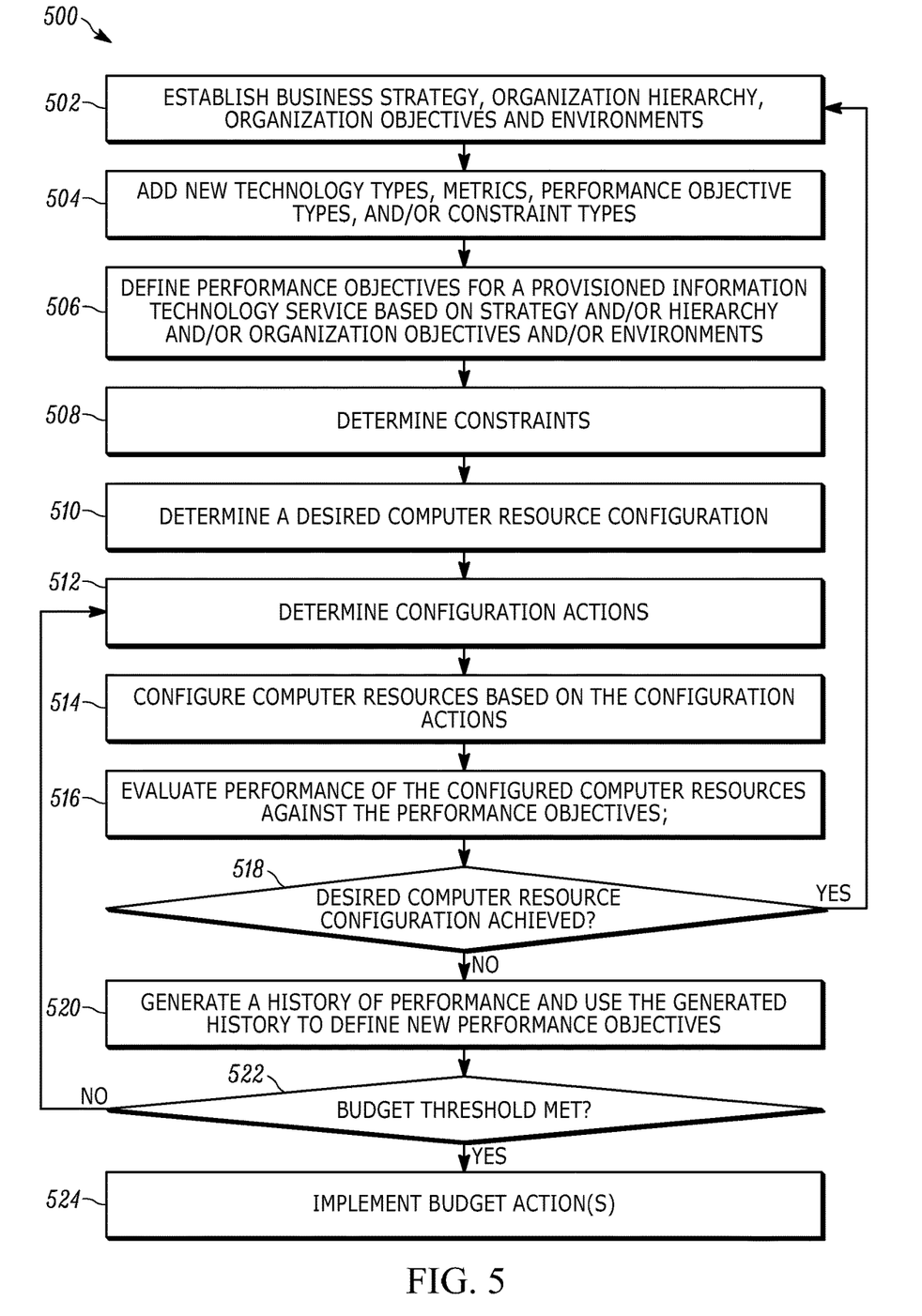
FIG. 5 illustrates a process flow diagram of an embodiment of a method for optimizing a computer resource configuration in a cloud environment to provision an information technology service according to the present teaching.

FIG. 5 illustrates a process flow diagram 500 of an embodiment of a method for optimizing a computer resource configuration in a cloud environment to provision an information technology service according to the present teaching. In step one 502 of the method 500, the business strategies and/or outcomes, organization hierarchies, organization objectives and/or organization environments are provided to the processing engine such that these high-level inputs can be processed to optimize the computer resource configuration or configurations used to provision the information technology services that are used to meet the business goals. In this way, step one 502 of the method 500 provides IT operators the ability to describe desired business outcomes, and then to allow the method 500 to use additional steps to manifest, using computer equipment, actions to configure computer resources to achieve those business outcomes into the underlying compute infrastructure. This is done uniformly across a diverse set of technologies and service delivery models, all while taking business context into account.

An example of a business outcome that relates to underlying technology is virtual desktop infrastructure (VDI) that can be delivered over dozens of technologies and providers. Regardless of the technology associated with the computer infrastructure that provisions VDI, a desired business outcome is to provide a secure VDI environment during business operating hours, while minimizing cost. The method 500 allows operators to describe these outcomes, and then to work towards manifesting the required infrastructure to achieve them on an ongoing basis. The method 500 allows business owners to define policies according to the context they will operate in, e.g. geographic locale where different geographies have different business hours, and business function where some functions operate only during business hours, and others are 24×7.

In some embodiments, sample business strategies are converted into performance objectives based on a combination of user, organization, and environment. These include, for example: 1) given business hours policy, apply lights on/off and auto scaling schedule; 2) given a definition of "zombie" (unused) infrastructure, proactively terminate it; 3) given recovery point/time objective, apply data protection (snapshots, cross region replication etc.) mechanism; 4) given policy for headroom and excess capacity, proactively provision capacity; 5) meet budgets; and 6) given workload availability requirements, determine oversubscription ratios (containers, VM's, QA vs Prod vs Dev) to be maintained.

In some embodiments, the business goal is running a VDI. This business goal includes a budget per dept., based on a number of employees, a lights On/Off based on working hours and locale, and selecting a region closest to employee location. In some embodiments, the business goal is running an Ecommerce web site. This business goal manifests performance as measured by latency of web-facing requests is monitored for <0.1 seconds. In a production, environment, additional resources may need to be deployed (or increased in capacity) based on historic patterns and current performance. Step one 502 of the method 500 establishes the business aspects above and/or other known business strategies and/or relevant other business aspects that impact the provisioning of the service using the computer infrastructure to meet business goals.

Step two 504 of the method 500 allows the addition of new technology types, metrics, performance objectives types and/or constraint types into the processing engine. Step two 504 is optional in some embodiments. Step two 504 can be implemented manually and/or automatically. The inputs for step two 504 can come from external sources, or they can be generated by other steps of the method 500. Step two 504 supports extensibility of the system, and allows the system to automatically adapt to change, for example changing business conditions and changing infrastructure. Step two 504 can be implemented at run time.

In step three 506 of the method 500, performance objectives for a provisioned information technology service based on the business elements established in step one 502 are defined. Performance objectives include a set of goals or targets, in this context for an IT system, to deliver to its users. Performance objectives include, for example, time to data recovery, database capability requirements, virtual desktop environment, desired cost, working hours, storage requests per second, service requests per second and security requirements. Performance objectives can be defined for one or more organizational structures. The hierarchy of a business organization can be included such that requirements from a parent organization flow down to any child organizations. Other organizational structures can also be included, along with the associated relationships. For example, matrix organizations can be included.

Performance objectives can be broad, and often conflicting. For example, a performance objective can be to deliver high-performance virtual desktop environments with a budget that is not larger than last month's budget. Additional examples of performance objectives include: 1) data recovery within a certain amount of time and to a certain recency, e.g. recover within 2 hours all data as of yesterday; 2) performance of website to maintain the 99% percentile of page load time below 0.1 seconds; 3) data locality objective to maintain data in the same jurisdiction as the user who owns the data; 4) budget adherence objective to perform Reserved Instance (RI) purchases at a monthly cadence to achieve at least 70% reservation coverage, but maintain a budget of less than 10,000.

Step four 508 of the method 500 determines constraints used by the processing engine to optimize a computer resource configuration. Constraints can derive from performance objectives that specify multiple desired outcomes to be achieved. Constraints can include security constraints, geographical constraints, data locality constraints, availability constraints, resiliency constraints and/or cost constraints. The constraints can be customized to the environment and or the underlying technology.

Step five 510 of the method 500 determines a desired computer resource configuration. The desired computer resource configuration achieves the defined performance objectives for the provisioned information technology service and also meets the constraints.

Step six 512 of the method 500 is to determine configuration actions for the underlying infrastructure. The current resource configuration that is currently provisioning the service is determined. The current computer resource configuration is compared to the desired resource configuration. Deviations resulting from the comparison are converted into configuration changes that will help bring the resource configuration being used to provision the service that is closer to, or the same as, the desired configuration. Examples of configuration actions include moving a workload to a new set of resources, migrating a service to a new type of service, migrating a service from one provider to another, bin packing servers into larger instances, oversubscribing containers, increasing cluster capacity and splitting a cluster. These are just examples. A large variety of known service provisioning mechanisms on a variety of underlying technologies can be used as all or part of a configuration action.

In step seven 514 of the method 500, the cloud infrastructure is reconfigured using the configuration actions. The reconfigured resources support the IT service. In step eight 516 of the method 500, the performance of the configured computer resources that are made based on the configuration actions is evaluated. This evaluation is performed based on a performance of the current configuration against the determined performance objectives from step three 506.

In step nine 518 of the method 500, a determination is made whether the desired computer resource configuration has been achieved. This determination is made based on the evaluation from step eight 516 of method 500. In some embodiments, if the desired state is achieved, the method 500 moves back to step one 502. In other embodiments, if the desired state is achieved, the system maintains the desired state. In yet other embodiments, if the desired state is not achieved, the method moves to step ten 520 of method 500. In step ten 520, a history is generated of the performance using the performance evaluation from step eight 516. This generated history in some embodiments is used to define new performance objectives. In some embodiments, the history is used to determine a new desired computer resource configuration. In other embodiments, this history is used to determine status of a budget.

As one example of history of performance, some embodiments of the method and system take into account the locale of users, business hours, historic workload capacity, and resource cost and then use the data to configure resources only for the duration they are needed. The method 500 can also record how well the provisioned resources perform and adjust the desired set of resources for a new time window using a history of performance. Another example of history of performance in the method 500 and system of the present teaching is a history of performance that tracks availability of budget for future actions. The actions performed to achieve a performance objective are recorded in a history store, which can inform future actions. The history of performance can be used to update performance objectives. The updates can include providing predictions. For example, the performance objectives can be updated based on predicting an expected load based on the generated history of performance.

In some embodiments, the history store is used to record utilization information as described above. Also, in some embodiments, the history store monitors budgets of various kinds. In these embodiments, the step eleven 522 of method 500 determines if a particular budget threshold is met. If the budget threshold is met, a series of budget actions are implemented in step twelve 524 of method 500. Budget actions can include various actions as describe further below. In some embodiments, if the budget threshold is not met, then the method 500 continues operation and can proceed to step six 512 of method 500.

In some embodiments, a performance objective specifies a monetary budget over an extended period of time, e.g. months or years, which is used up incrementally, as e.g. VDI are provisioned. As the budget draws down, the system will notify operators using the budget action in step twelve 524 if there's a risk that the budget will be exhausted prior to fully achieving the performance objective.

Another example budget is an error budget. Error budgets keep track of cumulative time an IT system is unavailable. An example of a performance objective is described as "ensure the system has current version of code running, with an error budget lower than 0.5% availability per quarter and minimize cost". To achieve this goal, the system described herein will monitor and accumulate the times the provisioned resources were unavailable due to the process of deploying new software releases, and then adjust and possibly halt the deployment procedures. As an example, when the available budget is relatively high (e.g. more than 50% remaining), the system will stop some resources running the old version of the software, and start new ones. While this method is expensive in terms of error budget, it is more economical in monetary terms. When the error budget is low, the system will launch additional resources with the latest version, preserving error budgets, but consuming monetary budgets. The history store is used to maintain the current available budgets.

In some embodiments, an optional monitoring threshold is determined and/or updated in step ten 520 of method 500. Once IT systems in an environment have been provisioned to achieve the desired performance objectives, the state might still fluctuate over time. Fluctuations can occur because of different load presented, because of failures in the underlying resources or for a variety of other reasons. To ensure the systems continue to deliver on the performance objectives, in some cases, it is possible to configure monitoring thresholds, which will notify systems according to the present teaching of the drift from the performance objective. Monitoring threshold was described further in connection with FIG. 3. For example, a performance objective of page load latency less than 0.1 seconds, operational monitoring systems can be configured to generate a notification. Similarly, an example is for a performance threshold of "Virtual Desktops should have adequate performance", where a collection of thresholds can be configured to ensure the key performance metrics are within adequate range. These metrics might include average CPU utilization, memory utilization and disk latency.

In some embodiments, the method 500 repeats steps five 510 through step nine 518. The repeating can operate continuously, in near real time, or can operate at desired time intervals. For example, in some methods, the time interval can be fifteen minutes or less. Also, in some methods, the repeating continues until the desired computer resource configuration has been achieved. Also, in some methods, the repeating continues until a desired monitoring threshold is met.

Various embodiments of the method and system of the present teaching can use all or some of the steps illustrated in FIG. 5. In some embodiments, the steps of the method 500 can proceed in a different order than shown in the embodiment of FIG. 5. The method 500 is executed in a resource configuration engine that comprises various processors and memory used to execute the steps in the method 500. The processors and memory can be centralized or distributed and can comprise various hardware devices and/or virtual machines.

One feature of the method and system of the present teaching is that it can include performance objectives that target a value or range of values for a service level. The objectives can be structured such that a performance is less than a target, or that a performance falls between a lower bound and an upper bound. The performance objectives of this type are best fashioned to utilize available indicators of the service level. These indicators can include known indicators available by various cloud service providers.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A computer-implemented method of optimizing a computer resource configuration in a cloud environment to provision an information technology service, the method comprising:
 a) determining performance objectives for a provisioned information technology service based on working hours of users of the cloud environment, the determining including defining the working hours and associating the performance objectives with the working hours based on input received from an operator of the cloud environment;
 b) determining constraints for the provisioned information technology service based on the determined performance objectives;
 c) determining, based on the working hours, a desired computer resource configuration to achieve the determined performance objectives for the provisioned information technology service and to meet the determined constraints for the provisioned information technology service;
 d) comparing a computer resource configuration with the desired resource configuration to determine configuration actions, wherein the configuration actions include transitioning a computer resource in the computer resource configuration to a new computer resource configuration;
 e) configuring available computer resources in the cloud environment and configuring the computer resource configuration in the cloud environment to realize the determined configuration actions;
 f) evaluating a current performance of the configured available computer resources in the cloud environment and evaluating a current performance of the configured computer resource configuration in the cloud environment compared to the performance objectives;
 g) determining if the desired computer resource configuration has been achieved based on the evaluated current performance of the configured available computer resources in the cloud environment and the evaluated current performance of the configured computer resource configuration in the cloud environment;
 h) generating a history of performance using the evaluated current performance of the configured available computer resources in the cloud environment and the evaluated current performance of the configured computer resource configuration in the cloud environment; and i) determining a new desired computer resource configuration to achieve the determined performance objectives using the generated history of performance.

2. The computer-implemented method of optimizing the computer resource configuration of claim 1 further including repeating c) through g).

3. The computer-implemented method of optimizing the computer resource configuration of claim 1 further including repeating c) through g) in near real time.

4. The computer-implemented method of optimizing the computer resource configuration of claim 1 further including repeating c) through g) until the determining if the desired computer resource configuration has been achieved based on the evaluated current performance of the configured available computer resources in the cloud environment and the configured computer resource configuration in the cloud environment determines that the desired computer resource configuration has been achieved.

5. The computer-implemented method of optimizing the computer resource configuration of claim 1 further including repeating c) through g) at a desired time interval.

6. The computer-implemented method of optimizing the computer resource configuration of claim 5 wherein the desired time interval is less than fifteen minutes.

7. The computer-implemented method of optimizing the computer resource configuration of claim 1 further including establishing a monitoring threshold.

8. The computer-implemented method of optimizing the computer resource configuration of claim 7, wherein the evaluating the current performance of the configured available computer resources in the cloud environment and the configured computer resource configuration in the cloud environment compared to the performance objectives includes being notified when the monitoring threshold exceeds desired range.

9. The computer-implemented method of optimizing the computer resource configuration of claim 1 wherein the transitioning the computer resource in the computer resource configuration to the new computer resource includes transitioning a computer resource comprising a type in the computer resource configuration to a new computer resource comprising a different type.

10. The computer-implemented method of optimizing the computer resource configuration of claim 1 wherein the transitioning the computer resource in the computer resource configuration to the new computer resource includes transitioning a computer resource comprising a server in the computer resource configuration to a new computer resource comprising a service.

11. The computer-implemented method of optimizing the computer resource configuration of claim 1 wherein the determining performance objectives for the provisioned information technology service includes determining performance objectives for the provisioned information technology service for at least two different business units.

12. The computer-implemented method of optimizing the computer resource configuration of claim 1 wherein the determining performance objectives for the provisioned information technology service includes determining performance objectives for the provisioned information technology service for at least two different organizational structures.

13. The computer-implemented method of optimizing the computer resource configuration in the cloud environment of claim 1 wherein the determining performance objectives for the provisioned information technology service includes defining security requirements.

14. The computer-implemented method of optimizing the computer resource configuration in the cloud environment of claim 1 wherein the determining performance objectives for the provisioned information technology service includes defining service requests per second.

15. The computer-implemented method of optimizing the computer resource configuration in the cloud environment of claim 1 wherein the determining performance objectives for the provisioned information technology service includes defining storage requests per second.

16. The computer-implemented method of optimizing the computer resource configuration in the cloud environment of claim 1 wherein the determining performance objectives for the provisioned information technology service includes defining database compatibility requirements.

17. The computer-implemented method of optimizing the computer resource configuration in the cloud environment of claim 1 wherein the determining performance objectives for the provisioned information technology service includes defining a desired virtual desktop environment and a desired cost.

18. The computer-implemented method of optimizing the computer resource configuration in the cloud environment of claim 1 wherein the determining performance objectives for the provisioned information technology service includes defining a time to data recovery.

19. The computer-implemented method of optimizing the computer resource configuration in the cloud environment of claim 1 wherein the determining performance objectives for the provisioned information technology service includes defining a web-site performance.

20. The computer-implemented method of optimizing the computer resource configuration in the cloud environment of claim 1 wherein the determining performance objectives for the provisioned information technology service includes defining a data locality condition.

21. The computer-implemented method of optimizing the computer resource configuration in the cloud environment of claim 1 wherein determining constraints for the provisioned information technology service based on the determined performance objectives includes determining security constraints.

22. The computer-implemented method of optimizing the computer resource configuration in the cloud environment of claim 1 wherein determining constraints for the provisioned information technology service based on the determined performance objectives includes determining geographical constraints.

23. The computer-implemented method of optimizing the computer resource configuration in the cloud environment of claim 1 wherein determining constraints for the provisioned information technology service based on the determined performance objectives includes determining data locality constraints.

24. The computer-implemented method of optimizing the computer resource configuration in the cloud environment of claim 1 wherein determining constraints for the provisioned information technology service based on the determined performance objectives includes determining cost constraints.

25. The computer-implemented method of optimizing the computer resource configuration in the cloud environment of claim 1 wherein the configuration actions further includes moving a work load to a new set of resources.

26. The computer-implemented method of optimizing the computer resource configuration in the cloud environment of claim 1 wherein the configuration actions further includes migrating a service to a new service.

27. The computer-implemented method of optimizing the computer resource configuration in the cloud environment of claim 1 wherein the configuration actions further include bin packing servers into larger instances.

28. The computer-implemented method of optimizing the computer resource configuration in the cloud environment of claim 1 wherein the configuration actions further include over-subscribing containers.

29. The computer-implemented method of optimizing the computer resource configuration in the cloud environment of claim 1 wherein the configuration actions further include increasing cluster capacity.

30. The computer-implemented method of optimizing the computer resource configuration in the cloud environment of claim 1 wherein the configuration actions further include splitting a cluster.

31. The computer-implemented method of optimizing the computer resource configuration in the cloud environment of claim 1 further including updating the performance objectives for the provisioned information technology service based on the generated history of performance.

32. The computer-implemented method of optimizing the computer resource configuration in the cloud environment of claim 31 wherein the updating the performance objectives for the provisioned information technology service based on the generated history of performance includes predicting an expected load based on the generated history of performance.

33. An apparatus comprising:
at least one memory;
instructions in the apparatus; and
processor circuitry to execute the instructions to:
a) determine performance objectives for a provisioned information technology service based on working hours of users of a cloud environment, the determining including defining the working hours and associating the performance objectives with the working hours based on input received from an operator of the cloud environment;
b) determine constraints for the provisioned information technology service based on the determined performance objectives;
c) determine, based on the working hours, a desired computer resource configuration to achieve the determined performance objectives for the provisioned information technology service and to meet the determined constraints for the provisioned information technology service;
d) compare a computer resource configuration with the desired resource configuration to determine configuration actions, wherein the configuration actions include transitioning a computer resource in the computer resource configuration to a new computer resource configuration;
e) configure available computer resources in the cloud environment and configuring the computer resource configuration in the cloud environment to realize the determined configuration actions;
f) evaluate a current performance of the configured available computer resources in the cloud environment and evaluating a current performance of the configured computer resource configuration in the cloud environment compared to the performance objectives;
g) determine if the desired computer resource configuration has been achieved based on the evaluated current performance of the configured available computer resources in the cloud environment and the evaluated current performance of the configured computer resource configuration in the cloud environment;
h) generate a history of performance using the evaluated current performance of the configured available computer resources in the cloud environment and the evaluated current performance of the configured computer resource configuration in the cloud environment; and
i) determine a new desired computer resource configuration to achieve the determined performance objectives using the generated history of performance.

34. The apparatus of claim 33, wherein the processor circuitry is to execute the instructions to repeat c) through g).

35. The apparatus of claim 33, wherein the processor circuitry is to execute the instructions to repeat c) through g) in near real time.

36. The apparatus of claim 33, wherein the processor circuitry is to execute the instructions to repeat c) through g) until the determining if the desired computer resource configuration has been achieved based on the evaluated current performance of the configured available computer resources in the cloud environment and the configured computer resource configuration in the cloud environment determines that the desired computer resource configuration has been achieved.

37. The apparatus of claim 33, wherein the processor circuitry is to execute the instructions to repeat c) through g) at a desired time interval.

38. The apparatus of claim 37, wherein the desired time interval is less than fifteen minutes.

39. The apparatus of claim 33, wherein the processor circuitry is to execute the instructions to establish a monitoring threshold.

40. The apparatus of claim 39, wherein the evaluating the current performance of the configured available computer resources in the cloud environment and the configured computer resource configuration in the cloud environment compared to the performance objectives includes being notified when the monitoring threshold exceeds desired range.

41. The apparatus of claim 33, wherein the transitioning the computer resource in the computer resource configuration to the new computer resource includes transitioning a computer resource comprising a type in the computer resource configuration to a new computer resource comprising a different type.

42. The apparatus of claim 33, wherein the transitioning the computer resource in the computer resource configuration to the new computer resource includes transitioning a computer resource comprising a server in the computer resource configuration to a new computer resource comprising a service.

43. The apparatus of claim 33, wherein the determining performance objectives for the provisioned information technology service includes determining performance objectives for the provisioned information technology service for at least two different business units.

44. The apparatus of claim 33, wherein the determining performance objectives for the provisioned information technology service includes determining performance objectives for the provisioned information technology service for at least two different organizational structures.

45. A non-transitory computer readable medium comprising instructions, which, when executed, cause processor circuitry to at least:

a) determine performance objectives for a provisioned information technology service based on working hours of users of a cloud environment, the determining including defining the working hours and associating the performance objectives with the working hours based on input received from an operator of the cloud environment;

b) determine constraints for the provisioned information technology service based on the determined performance objectives;

c) determine, based on the working hours, a desired computer resource configuration to achieve the determined performance objectives for the provisioned information technology service and to meet the determined constraints for the provisioned information technology service;

d) compare a computer resource configuration with the desired resource configuration to determine configuration actions, wherein the configuration actions include transitioning a computer resource in the computer resource configuration to a new computer resource configuration;

e) configure available computer resources in the cloud environment and configuring the computer resource configuration in the cloud environment to realize the determined configuration actions;

f) evaluate a current performance of the configured available computer resources in the cloud environment and evaluating a current performance of the configured computer resource configuration in the cloud environment compared to the performance objectives;

g) determine if the desired computer resource configuration has been achieved based on the evaluated current performance of the configured available computer resources in the cloud environment and the evaluated current performance of the configured computer resource configuration in the cloud environment;

h) generate a history of performance using the evaluated current performance of the configured available computer resources in the cloud environment and the evaluated current performance of the configured computer resource configuration in the cloud environment; and i) determine a new desired computer resource configuration to achieve the determined performance objectives using the generated history of performance.

46. The non-transitory computer readable medium of claim 45, wherein the processor circuitry is to execute the instructions to repeat c) through g).

47. The non-transitory computer readable medium of claim 45, wherein the instructions, when executed, cause the processor circuitry to repeat c) through g) in near real time.

48. The non-transitory computer readable medium of claim 45, wherein the instructions, when executed, cause the processor circuitry to repeat c) through g) until the determining if the desired computer resource configuration has been achieved based on the evaluated current performance of the configured available computer resources in the cloud environment and the configured computer resource configuration in the cloud environment determines that the desired computer resource configuration has been achieved.

49. The non-transitory computer readable medium of claim 45, wherein the processor circuitry is to execute the instructions to repeat c) through g) at a desired time interval.

50. The non-transitory computer readable medium of claim 49, wherein the desired time interval is less than fifteen minutes.

51. The non-transitory computer readable medium of claim 45, wherein the processor circuitry is to execute the instructions to establish a monitoring threshold.

52. The non-transitory computer readable medium of claim 51, wherein the evaluating the current performance of the configured available computer resources in the cloud environment and the configured computer resource configuration in the cloud environment compared to the performance objectives includes being notified when the monitoring threshold exceeds desired range.

53. The non-transitory computer readable medium of claim 45, wherein the transitioning the computer resource in the computer resource configuration to the new computer resource includes transitioning a computer resource comprising a type in the computer resource configuration to a new computer resource comprising a different type.

54. The non-transitory computer readable medium of claim 45, wherein the transitioning the computer resource in the computer resource configuration to the new computer resource includes transitioning a computer resource comprising a server in the computer resource configuration to a new computer resource comprising a service.

55. The non-transitory computer readable medium of claim 45, wherein the determining performance objectives for the provisioned information technology service includes determining performance objectives for the provisioned information technology service for at least two different business units.

* * * * *